United States Patent
Kyung-Sook et al.

(10) Patent No.: US 8,612,557 B2
(45) Date of Patent: Dec. 17, 2013

(54) METHOD FOR ESTABLISHING CONNECTION BETWEEN USER-NETWORK OF OTHER TECHNOLOGY AND DOMAIN NAME SYSTEM PROXY SERVER FOR CONTROLLING THE SAME

(75) Inventors: Kim Kyung-Sook, Daejeon (KR); Jung-Sook Bae, Daejeon (KR); Mahn-Hoon Lee, Kamploops (CA); Sook-Yang Kang, Daejeon (KR); Hyun-Seo Park, Daejeon (KR); Gyung-Chul Shin, Daejeon (KR); Dae-Sik Kim, Daejeon (KR); Yong-Ik Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 746 days.

(21) Appl. No.: 12/548,319

(22) Filed: Aug. 26, 2009

(65) Prior Publication Data

US 2009/0313357 A1    Dec. 17, 2009

Related U.S. Application Data

(63) Continuation of application No. 11/634,984, filed on Dec. 7, 2006, now abandoned.

(30) Foreign Application Priority Data

Dec. 8, 2005 (KR) .................. 10-2005-0119872
Apr. 24, 2006 (KR) .................. 10-2006-0036578

(51) Int. Cl.
  *G06F 15/177* (2006.01)
(52) U.S. Cl.
  USPC .................................................... 709/220

(58) Field of Classification Search
  USPC .......................................................... 709/220
  See application file for complete search history.

(56) References Cited

U.S. PATENT DOCUMENTS

| | | | |
|---|---|---|---|
| 7,133,404 B1 * | 11/2006 | Alkhatib et al. | 370/392 |
| 2004/0223766 A1 | 11/2004 | Lanne | |
| 2005/0265727 A1 | 12/2005 | Glingener | |
| 2005/0265728 A1 | 12/2005 | Yao | |
| 2007/0134000 A1 | 6/2007 | Lee et al. | |

OTHER PUBLICATIONS

Mgritter Cheriton; "A New Next-Generation Internet Architecture"; TRIAD; pp. 1-20, Reproduced on Aug. 31, 2006.
P. Srisuresh et al.; "Traditional IP Network Address Translator (Traditional NAT)"; Network Working Group; Jan. 2001; pp. 1-18. (Jan. 2001).
W. Borella et al.; "Realm Specific IP: Protocol Specification"; Network Working Group; Oct. 2001; pp. 1-56. (Oct. 2001).
G. Tsirsis et al.; "Network Address Translation—Protocol Translation (NAT-PT)"; Network Working Group; pp. 1-22. (Feb. 2000).

* cited by examiner

*Primary Examiner* — Maceeh Anwari
(74) *Attorney, Agent, or Firm* — Lowe Hauptman & Ham LLP

(57) ABSTRACT

The present invention relates to a method for establishing a connection between heterogeneous user-networks and a domain name system proxy server for controlling the same. The present invention has features of providing a method for supporting communication between user-computers included in Internet-compatible heterogeneous networks through a gateway based on an Internet public network and a domain name system proxy server for controlling the method. According to the present invention, supporting mutual communication between various networks based on one network can be expected.

12 Claims, 6 Drawing Sheets

METHOD FOR ESTABLISHING CONNECTION BETWEEN USER-NETWORK OF OTHER TECHNOLOGY AND DOMAIN NAME SYSTEM PROXY SERVER FOR CONTROLLING THE SAME

CROSS-REFERENCE TO RELATED APPLICATION

The present Continuation application is based on, and claims priority from, U.S. application No. 11/634,984, filed Dec. 7, 2006, the disclosure of which is hereby incorporated by reference herein in its entirety. This Continuation application also claims priority to and the benefits of Korean Patent Application Nos. 10-2005-0119872 and 10-2006-0036578 respectively filed in the Korean Intellectual Property Office on Dec. 8, 2005 and Apr. 24, 2006, the entire contents of which are incorporated herein by reference.

BACKGROUND OF THE INVENTION (a) Field of the Invention

The present invention relates to a method for establishing a connection over user computers in heterogeneous networks, and a domain name system proxy server for controlling the same. More particularly, the present invention relates to a method for supporting communication between user computers included in Internet-compatible heterogeneous networks through a gateway based on an Internet public network.

(b) Description of the Related Art

The address shortage problem in Internet protocol version 4 (IPv4) was brought out about two decades ago, and many solutions have been suggested since then and they have been integrated into Internet protocol version 6 (IPv6).

The IPv6 provides a larger address space, but the use of the address space is limited.

Accordingly, new schemes have been suggested and standardized. Among the new schemes, Network Address Translation (NAT) is a method by which IP addresses are mapped from one group to another, and are transparent to end users by using a residual network address.

The NAT provides a connection from an IPv4 private user-network to an IPv6 public network using one or few public network addresses through a gateway without modification of protocol stacks in a user's computer, but it depends on end-to-end consistency.

Similar to the NAT, a Realm Specific Internet Protocol (RSIP) has been suggested as an IP address translation technique, as an alternative to the NAT. The RSIP has been standardized for solving the problem of the NAT, but it also has a problem of requiring a change of a protocol stack in a user's computer.

A NAT Protocol Translation (NAT-TP) is a method for translating network addresses and TCP/UDP ports into TCP/UDP ports that correspond to one network address, and providing a transparent connection to IPv4 public network users in the IPv6 network by using the NAT.

A Translating, Relaying Internet Architecture Integrating Active Directories (TRIAD) connects two IPv4 private user-networks through gateways based on an IPv4 public network.

Therefore, communication between one private user-network and another private user-network can be achieved. However, similar to the RSIP, the TRAID also requires protocol stack modification within a user-computer and therefore it is inappropriate for common use.

Therefore, the prior arts cannot support communication between Internet-compatible heterogeneous user-networks due to the protocol stack modification and end-to-end consistency requirements.

For example, as shown in FIG. 1, the prior arts cannot support communication between one IPv4 private user-network and another IPv4 private user-network, communication between one IPv4 public user-network and an IPv4 private user-network, communication between an IPv6 network and an IPv4 private user-network, and communication between an IPv4 public user-network and an IPv6 user-network.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for establishing a connection between Internet-compatible heterogeneous user-networks having advantages of connecting the heterogeneous user-networks without requiring protocol stack modification in a user-computer, and a domain name system (DNS) proxy server for controlling the same.

In a method for establishing a connection between user-computers belonging to Internet-compatible heterogeneous user-networks according to an embodiment of the present invention is provided to establish a connection between the user-computers belonging to the Internet-compatible heterogeneous user-networks based on an Internet public network, the method includes: (a) receiving a domain name translation request from a first user-computer included in a first user-network, the domain name translation request including domain name information of a second user-computer; and (b) allocating an address of the first user-network for indicating an entire network address of the second user-computer and transmitting the allocated address together with the entire network address to the first user-computer.

In another method for establishing a connection between user-computers belonging to Internet-compatible heterogeneous networks according to another embodiment of the present invention is provided to establish a connection between the user-computers belonging to the Internet-compatible heterogeneous user-networks based on an Internet public network, the method includes: (a) receiving a domain name translation request from a first user-computer included in a first user-network, the request including specific domain name information; (b) extracting entire network address information of a second user-computer from the specific domain name information; and (c) allocating an address of the first user-network for indicating the entire network address of the second user-computer and transmitting the allocated address together with the entire network address to the first user-computer.

A domain name system (DNS) proxy server according to another exemplary embodiment of the present invention determines whether to open or close an Internet application program of a user-computer by using web page information. The DNS proxy server includes an internal memory unit, an internal database, and a controller. The internal memory unit stores entire network address information of a second user-computer included in a second user-network. The internal database stores a specific address of a first user-network for indicating and accessing the entire network address. When receiving a domain name translation request for the second user-computer for a first user-computer included in the first user-network, the controller transmits the specific address of the first user-network allocated to the internal database to the first user-computer with reference to address information of the second user-computer stored in the internal memory unit.

DETAILED DESCRIPTION OF THE EMBODIMENTS

Figure 1:
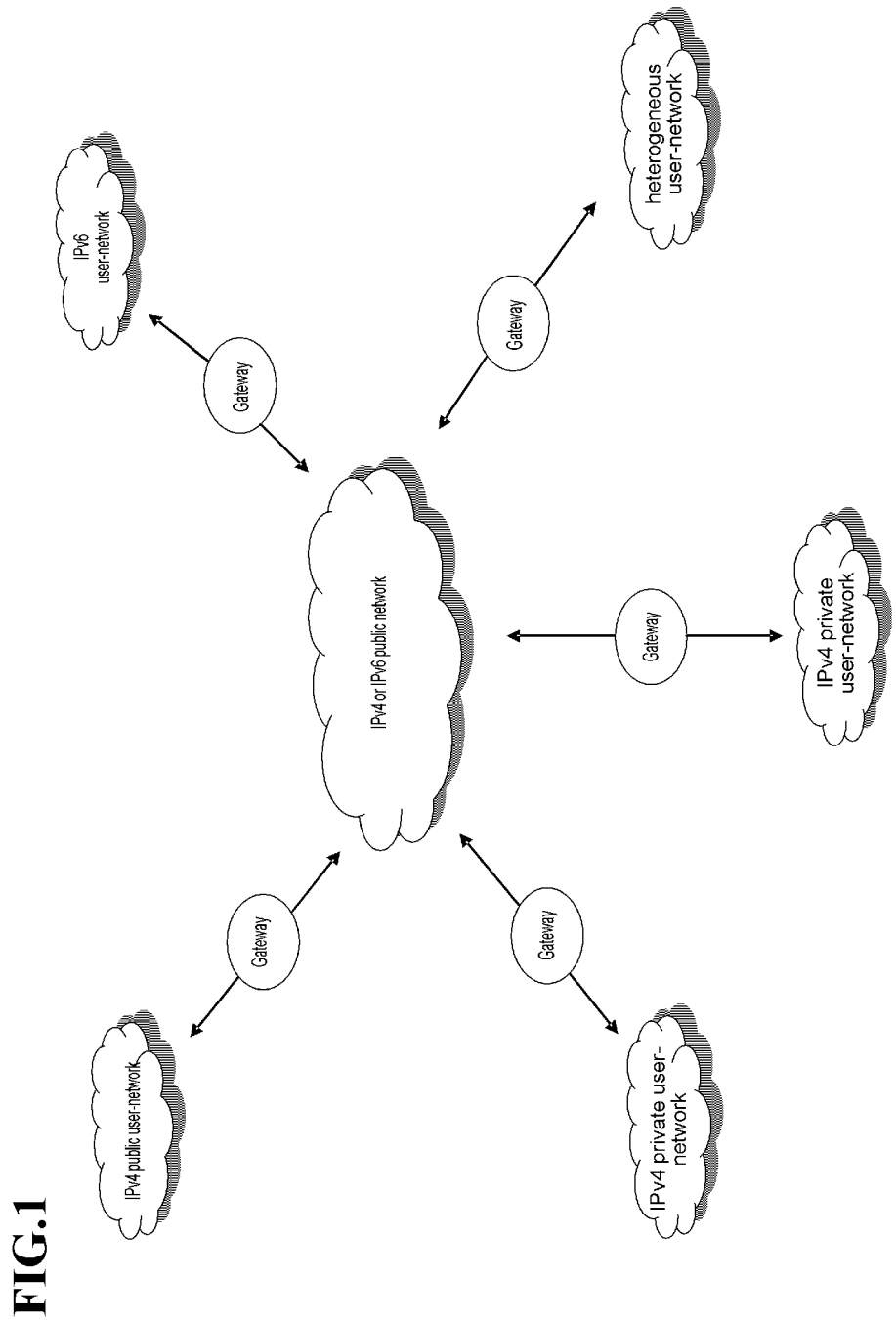
FIG. 1 schematically shows a conventional connection between an Internet public network and a user-network.

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" or variations such as "comprises" or "comprising" will be understood to imply the inclusion of stated elements but not the exclusion of any other elements.

A method for establishing a connection between heterogeneous user-networks and a domain name system proxy server 104 that controls the connection according to an exemplary embodiment of the present invention will now be described with reference to the accompanying drawings.

Figure 2:
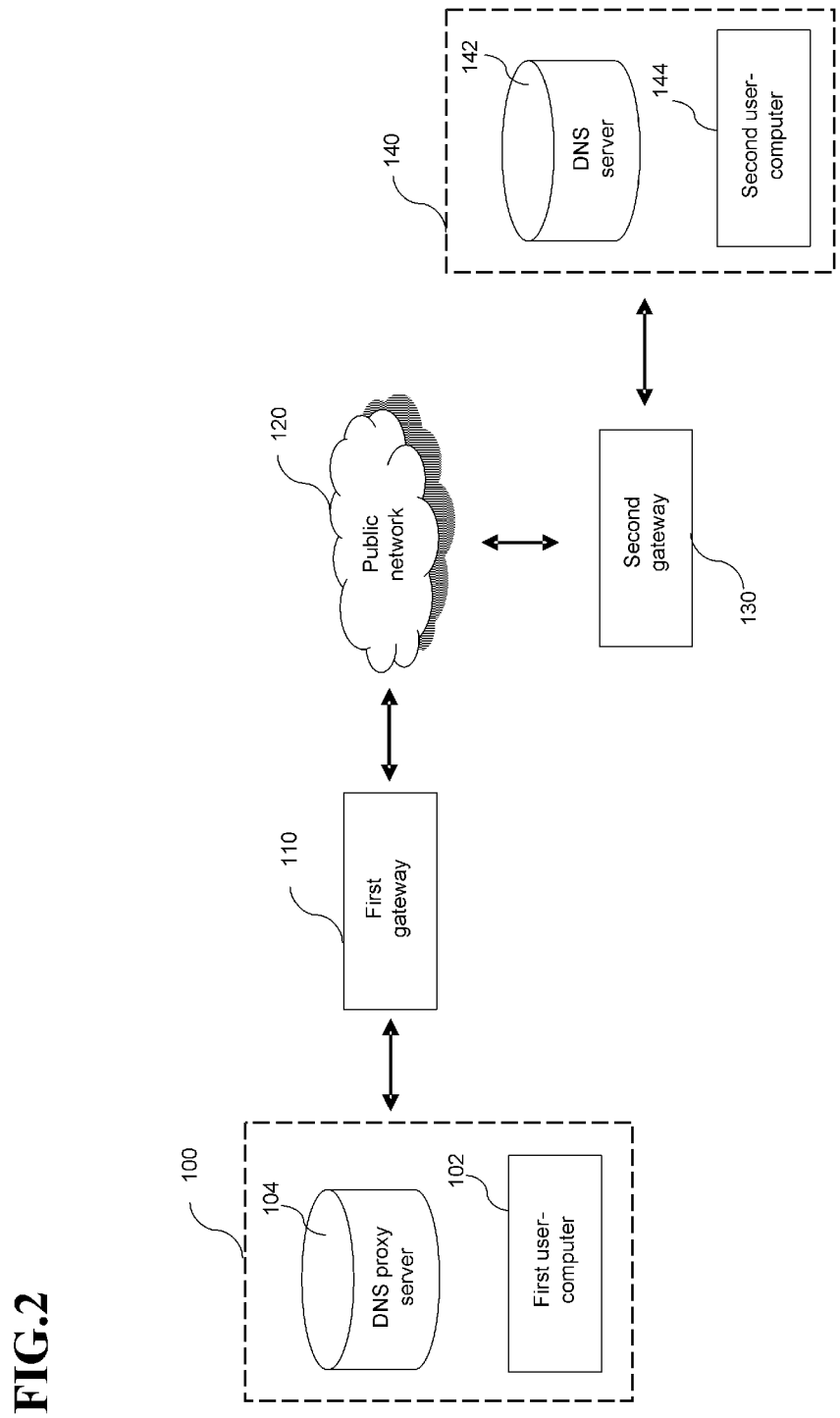
FIG. 2 schematically shows a communication integrated network system that includes Internet-compatible heterogeneous user-networks according to an exemplary embodiment of the present invention.

FIG. 2 schematically shows an integrated communication network system that includes an Internet-compatible heterogeneous user-network according to an exemplary embodiment of the present invention.

In the present exemplary embodiment, when a node is connected to a network, an address of the node in the corresponding network is represented by a name of the node in a capital letter and a name of the network in a subscript format. For example, a notational convention for an address of a node named X in a network named CN is $X_{CN}$.

Accordingly, address information on a second user-computer 144 in the entire network implies a specific address of the second user-computer 144 in a second user-network 140. As shown in FIG. 2, an address of the second user-computer (C) 144 in the second user-network (AnyNet2) 140 has an address represented as $A_{CN}:C_{AnyNet2}$ in the entire network. Herein, $A_{CN}:C_{AnyNet2}$ is formed by a combination of an address $A_{CN}$ of a public network 120 in a second gateway (A) 130 and an address $C_{AnyNet2}$ of the second user-computer (C) 144 in the second user-network (AnyNet2) 140.

In addition, a first user-computer 100 and the second user-computer 144 are each a system having a display device, an input device, a storage medium, a processor, an operating system, and a local bus performing data transmission with the processor with predetermined timing. The system can be provided as a terminal having a web browser for Internet access and being capable of radio data transmission.

The communication integrated network system according to the exemplary embodiment of the present invention includes a first user-network (AnyNet1) 100, a first gateway (X) 110, a public network (CN) 120, a second gateway (A) 130, and a second user-network (AnyNet2) 140.

A gateway has an address of a public network 120, and is allocated addresses that are not used in a user-network.

The user-network routes the addresses that are not in use to the gateway.

Herein, the addresses that are not in use in the user-network are used for indicating and accessing computers included in a different user-network, and they will be referred to as a user-network specific address.

Each user-network may use a domain name system (DNS) proxy server 104 or a DNS server 142.

The first user-network 100 according to the exemplary embodiment of the present invention includes a first user-computer 100 and a DNS proxy server 104.

The first user-computer 100 generates a domain name translation request signal that contains domain name information, and transmits the domain name translation signal to the DNS proxy server 104.

Herein, the domain name information is used to indicate the second user-computer 144 in the second user-network 140.

The first user-computer 100 may use specific domain name information or domain name information of the second user-computer 144 in order to access the second user-computer 144 in the second user-network 140, wherein the specific domain name information includes an entire network address of the second user-computer 144.

Herein, the specific domain name information is formed by a combination of an address in the entire network and a specific word.

For example, a notational convention of the specific domain name information of the second user-computer 144 is $A_{CN}.C_{AnyNet2}$.una, and will be called a UNA domain name in all categories.

The DNS proxy server 104 receives entire address information of the second user-computer 144 from the second user-network 140.

The DNS proxy server 104 is allocated a user-network specific address in which the above-stated address information is to be stored from the first gateway 110, and transmits the user-network specific address that contains the entire network address information of the second user-computer 144 to the first user-computer 100. An internal configuration of the DNS proxy server 104 will be described later in more detail with reference to FIG. 3.

The first gateway 104 establishes a connection between the public network 120 and the first user-network 100 for communication therebetween, has an address of a public network 120, and is allocated addresses that are not used in the first user-network 100 from the first user-network 100 and stores the addresses. Herein, the addresses that are not used are user-network specific addresses.

When receiving a user-network specific address allocation request signal from the DNS proxy server 104 for storing an entire network address $A_{CN}$:$C_{AnyNet2}$ of the second user-computer (C) 144, the first gateway 110 allocates a user-network specific address $T_{AnyNet1}$ and transmits the allocated address to the DNS proxy server 104.

The public network 120 is provided as a switched-connection type of electric telecommunication network that connects the first user-network 100 and the second user-network 140.

The public network 120 is a communication network that provides services to many and unspecified users by network switching, and can be provided as an IPv4 public network, an IPv6 public network, an integrated service digital network (ISDN), and a packet switched data network.

The second gateway 130 establishes a connection between the public network 120 and the second user-network 140 for communication therebetween, has an address of a public network 120, and is allocated addresses that are not used in the second user-network 120 from the second user-network 120 and stores the addresses. Herein, the addresses that are not in use in the second user-network 120 are user-network specific addresses.

The second user-network 140 includes the second user-computer 144, the DNS server 142, and the second gateway 130.

The second user-computer 144 provides the same functions as those of the first user-computer 100, and may use the specific domain name information that includes an entire network address of the first user-computer 100 or the domain name information on the first user-computer 100 so as to access the first user-computer 100.

The DNS server 142 is a server for mapping domain name information to an Internet protocol (IP) address.

When receiving the domain name translation request signal from the DNS proxy server 104, the DNS server 142 searches for the entire network address $A_{CN}$:$C_{AnyNet2}$ of the second user-computer (C) 144 through an internal database (not shown) by using the domain name information contained in the domain name translation request signal as an inquiry language, and transmits the searched address to the DNS proxy server 104 through the public network 120.

The DNS server 142 stores information on a domain name for a computer system in the second user-network 140, and entire network address information of the second user-computer 144.

The internal configuration of the DNS proxy server 104 will now be described in detail with reference to FIG. 3.

Figure 3:
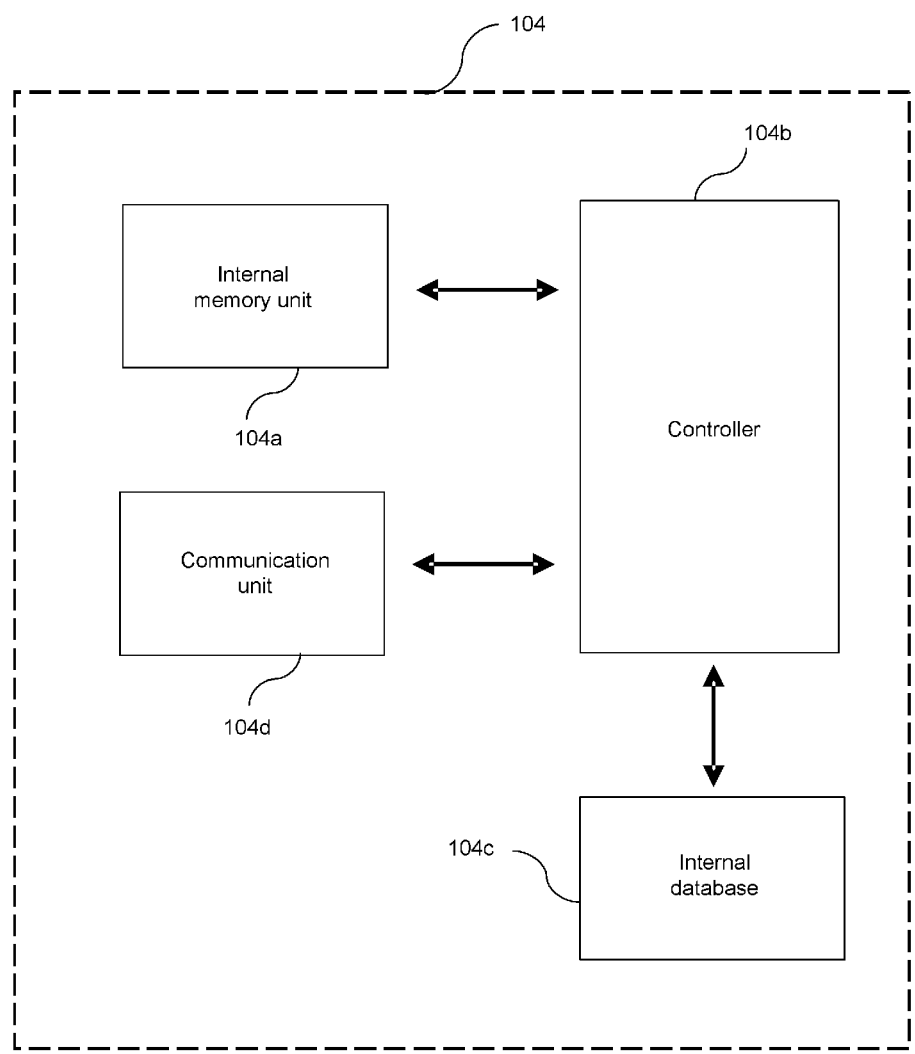
FIG. 3 is a block diagram schematically showing an internal configuration of a DNS proxy server according to the exemplary embodiment of the present invention.

FIG. 3 is a schematic block diagram showing an internal configuration of the DNS proxy server 104 according to an exemplary embodiment of the present invention.

The DNS proxy server 104 according to the exemplary embodiment of the present invention includes an internal memory unit 104a, a controller 104b, an internal database 104c, and a communication unit 104d.

The internal memory unit 104a stores data processed by the controller 104b or stores entire network address information of the second user-computer (C) 144.

When receiving a domain name translation request signal that includes domain name information from the first user-computer 100, the controller 104b determines whether the entire network address information of the second user-computer (C) 144 is stored in the internal memory unit 104.

In the case that the controller 104b determines that the entire network address information of the second user-computer 144 is not stored in the internal memory unit 104a, the controller 104b forwards the domain name translation request signal that has been transmitted from the first user-computer (A) 100 to the DNS server 142 of the second user-network AnyNet2 140.

The controller 104b generates a signal for requesting a user-network specific address $T_{AnyNet1}$ for storing the entire network address ($A_{CN}$:$C_{AnyNet2}$) of the second user-computer (C) 144 in the second user-network (AnyNet2) 140, and transmits the user-network specific address request signal to the first gateway 110.

The controller 104b is allocated a user-network specific address $T_{AnyNet1}$ from the first gateway 110 and transmits the allocated address to the first user-computer (A) 100. Herein, the user-network specific address indicates the entire network address ($A_{CN}$:$C_{AnyNet2}$) of the second user-computer (C) 144.

When receiving the domain name translation request signal that contains specific domain name information from the first user-computer 100, the controller 104b extracts information on the entire network address of the second user-computer 144 from the specific domain name information.

The internal database 104c receives a user-network specific address $T_{AnyNet1}$ for the entire network address $A_{CN}$:$C_{AnyNet2}$ of the second user-computer C 144 from the first gateway 110 and stores the received address. That is, the internal database 104c stores the entire network address $A_{CN}$:$C_{AnyNet2}$ of the second user-computer C 144 together with the user-network specific address $T_{AnyNet1}$ that indicates the address $A_{CN}$:$C_{AnyNet2}$ as $T_{AnyNet1}$:($A_{CN}$:$C_{AnyNet2}$).

As a communication module for providing a communication interface for communication with an Internet or a mobile communication network, the communication unit 104d performs a communication interface function for various signals and messages input/output to/from the DNS proxy server 104.

A method for attempting communication between computers in heterogeneous user-networks by using domain name information will now be described with reference to FIG. 4.

Figure 4:
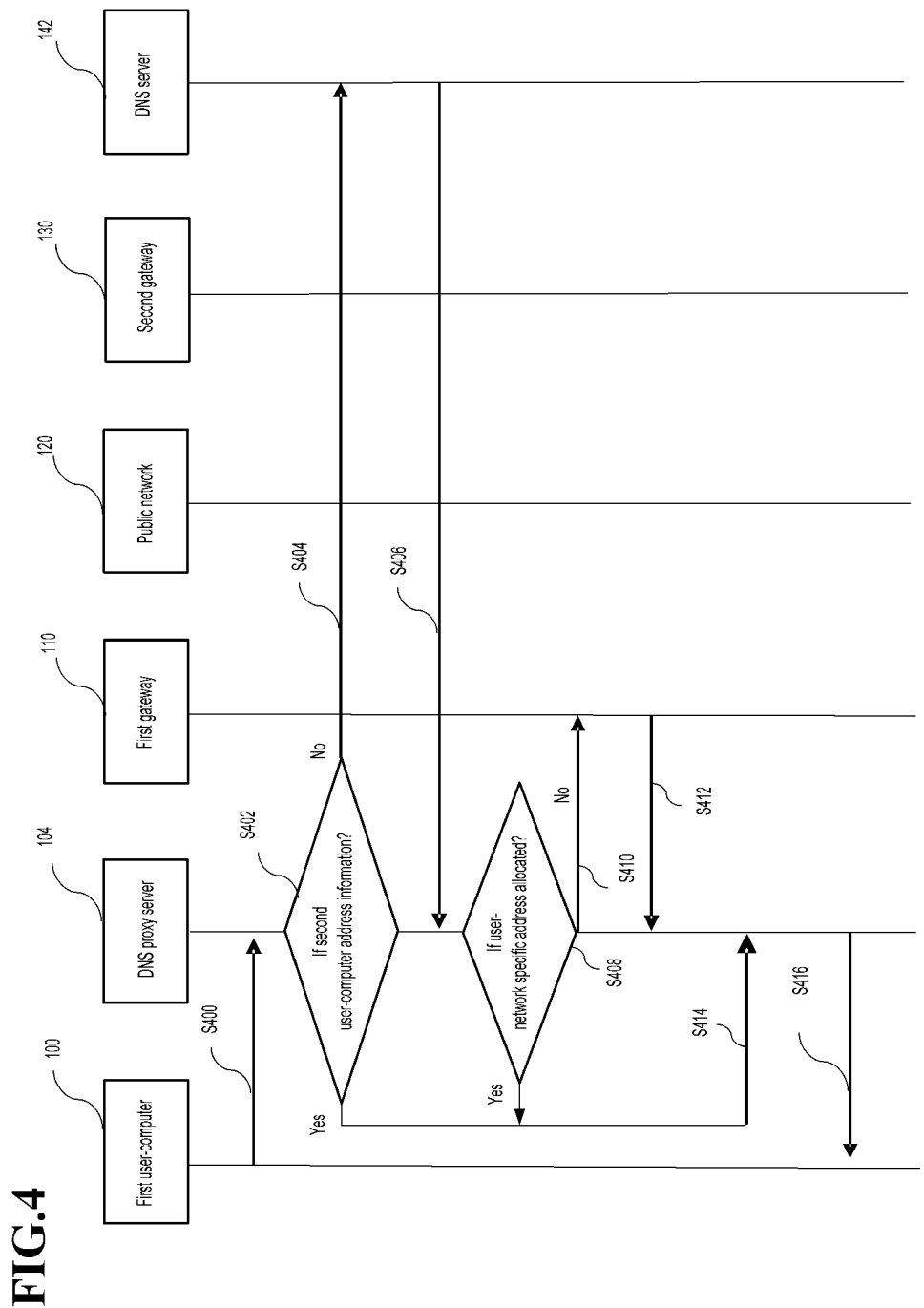
FIG. 4 schematically shows an address negotiation process for attempting communication between computers in heterogeneous user-networks by using domain name information according to the exemplary embodiment of the present invention.

FIG. 4 shows a method of address negotiation for attempting communication between computers in heterogeneous user-networks by using domain name information according to an exemplary embodiment of the present invention.

The first user-computer 100 generates a domain name translation request signal containing domain name information and transmits the domain name translation signal to the DNS proxy server 104 in step S400. Herein, the domain name information is information for indicating and accessing the second user-computer 144 in the second user-network 140.

When receiving the domain name translation request signal, the DNS proxy server 104 determines whether information on the entire network address $A_{CN}$:$C_{AnyNet2}$ of the second user-computer 144 is stored in the internal memory unit 104a of the DNS proxy server 104 in step S402.

When it is determined that the information on the entire network address of the second user-computer 144 is not stored in step S402, the DNS proxy server 104 forwards the domain name translation request signal that has been transmitted from the first user-computer 100 to the DSN server 142 through the first gateway 110, the public network 120, and the second gateway 130 in step S404.

The DNS server 142 searches for the entire network address of the second user-computer C 144 through an internal database (not shown) of the DNS server 142 by using the domain name information included in the domain name translation request signal as a query language, and transmits the search result to the DNS proxy server 104 through the second gateway 130, the public network 120, and the first gateway 110 in step S406.

In addition, it is determined that the entire network address of the second user-computer C 144 is stored in the internal memory unit 104a in step S402, and the DNS proxy server 104 performs step S408.

In step S408, the DNS proxy server 104 determines whether a user-network specific address (i.e., an address for indicating computers in a different user-network) is allocated to store the entire network address $A_{CN}:C_{AnyNet2}$ of the second user-computer 144 in the internal database 104c of the DNS proxy server 104.

When it is determined that the user-network specific address is not allocated in step S408, the DNS proxy server 104 generates a request signal for allocation of a user-network specific address and transmits the request signal to the first gateway 104 in step S410.

Then, the first gateway 110 determines whether the user-network specific address is allocated for storing the entire network address $A_{CN}:C_{AnyNet2}$ of the second user-computer 144 and allocates a locally unique user-network specific address $T_{AnyNet1}$ and transmits the user-network specific address $T_{AnyNet1}$ to the DNS proxy server 104 when it is determined that the user-network specific address is not allocated, in step S412.

Herein, the user-network specific address $T_{AnyNet1}$ is an amount of addresses that are not used in the second user-network 140, and is used for indicating computers in a different user-network.

That is, the user-network specific address $T_{AnyNet1}$ stores the entire network address of the second user-computer C 144.

The first gateway 104 stores the user-network specific address $T_{AnyNet1}$ and an entire network address $A_{CN}:C_{AnyNet2}$ of the second user-computer 144 in an address translation database formed in the first gateway 110 for a predetermined period of time. Herein, the entire network address $A_{CN}:C_{AnyNet2}$ matches the user-network specific address $T_{AnyNet1}$.

When it is determined the user-network specific address is allocated in step S414, the DNS proxy server 104 receives the user-network specific address $T_{AnyNet1}:(A_{CN}:C_{AnyNet2})$ allocated by the first gateway 110 and transmits the received address to the first user-computer 100 in step S416.

The DNS proxy server 104 may store the user-network specific address $T_{AnyNet1}$ and the entire network address $A_{CN}:C_{AnyNet2}$ of the second user-computer 144 in the internal database 104c of the DNS proxy server 104 for a predetermined period of time. Herein, the entire network address $A_{CN}:C_{AnyNet2}$ of the second user-computer 144 is an address that matches the user-network specific address $T_{AnyNet1}$.

A method for attempting communication between computers in a heterogeneous network by using specific domain name information will now be described with reference to FIG. 5.

Figure 5:
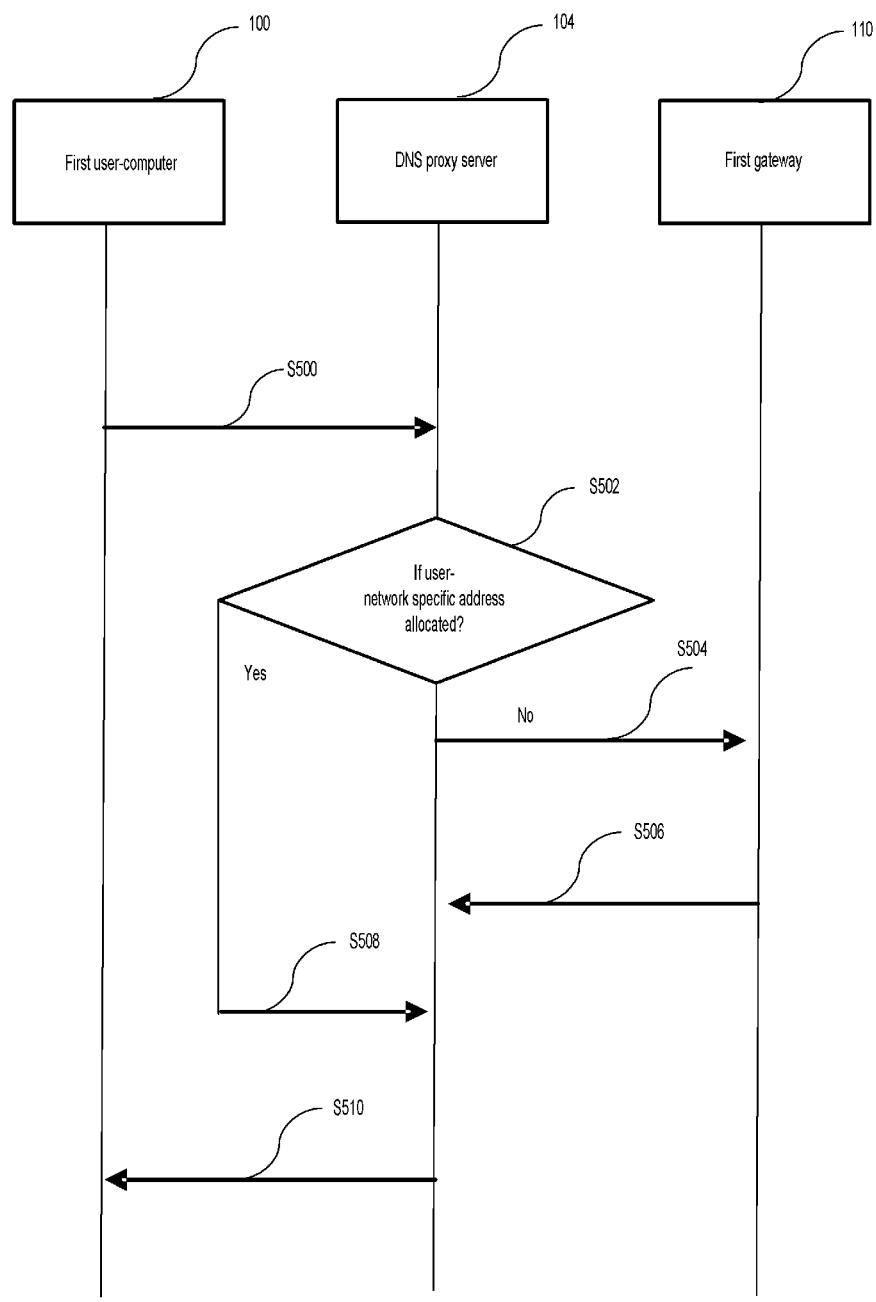
FIG. 5 schematically shows an address negotiation process for attempting communication between computers in heterogeneous user-networks by using specific domain name information according to the exemplary embodiment of the present invention.

FIG. 5 schematically shows an address negotiation method for attempting communication between computers in a heterogeneous network by using specific domain name information according to an exemplary embodiment of the present invention.

The first user-computer 100 may use specific domain name information that contains an entire network address of the second user-computer 144 to indicate and access the second user-computer 144.

Herein, the specific domain name information is in the form of a combination of an entire network address and a specific word.

For example, a notational convention of a specific domain name of the second user-computer 144 is $A_{CN}.C_{AnyNet2}$.una, and is called a UNA domain name in all categories. Therefore, the specific domain name information includes the entire network address $A_{CN}:C_{AnyNet2}$ of the second user-computer 144.

The first user-computer 100 generates a domain name translation request signal that contains the specific domain name information and transmits the signal to the DNS proxy server 104 in step S500.

The DNS proxy server 104 extracts the entire network address $A_{CN}:C_{AnyNet2}$ of the second user-computer 144 from the specific domain name information included in the domain name translation request signal.

Subsequently, the DNS proxy server 104 determines whether a user-network specific address is allocated to the internal database 104c for storing the entire network address $A_{CN}:C_{AnyNet2}$ of the second user-computer 144 in step S502. Herein, the user-network specific address is an address used for indicating computers included in a different user-network.

When the DNS proxy server 104 determines that the user-network specific address is not allocated to the internal database 104c, the DNS proxy server 104 generates a user-network specific address allocation request signal and transmits the signal to the first gateway 104 in step S504.

The first gateway 110 determines whether a user-network specific address $T_{AnyNet1}$ is allocated for storing the entire network address $A_{CN}:C_{AnyNet2}$ of the second user-computer 144, and when the user-network specific address $T_{AnyNet1}$ is not allocated, the first gateway 110 allocates the user-network specific address $T_{AnyNet1}$ and transmits the same to the DNS proxy server 104, in step S506.

Herein, the user-network specific address $T_{AnyNet1}$ is an amount of addresses that are not used in the second user-network 140, and is used for indicating computers included in a different user-network.

That is, the user-network specific address $T_{AnyNet1}$ indicates an entire network address of the second user-computer (C) 144.

The first gateway 104 stores the user-network specific address $T_{AnyNet1}$ and an entire network address $A_{CN}:C_{AnyNet2}$ of the second user-computer 144 in an address translation database formed in the first gateway 110 for a predetermined period of time. Herein, the entire network address $A_{CN}:C_{AnyNet2}$ matches the user-network specific address $T_{AnyNet1}$.

When it is determined that the user-network specific address is allocated in step S508, the DNS proxy server 104 receives the user-network specific address $T_{AnyNet1}:(A_{CN}:C_{AnyNet2})$ allocated by the first gateway 110 and transmits the received address to the first user-computer 100 in step S510.

The DNS proxy server 104 may store the user-network specific address $T_{AnyNet1}$ and the entire network address $A_{CN}:C_{AnyNet2}$ of the second user-computer 144 in the internal database 104c of the DNS proxy server 104 for a predetermined period of time. Herein, the entire network address $A_{CN}:C_{AnyNet2}$ of the second user-computer 144 is an address that matches the user-network specific address $T_{AnyNet1}$.

Hereinafter, a packet data transmission process will be described in more detail with reference to FIG. 6.

Figure 6:
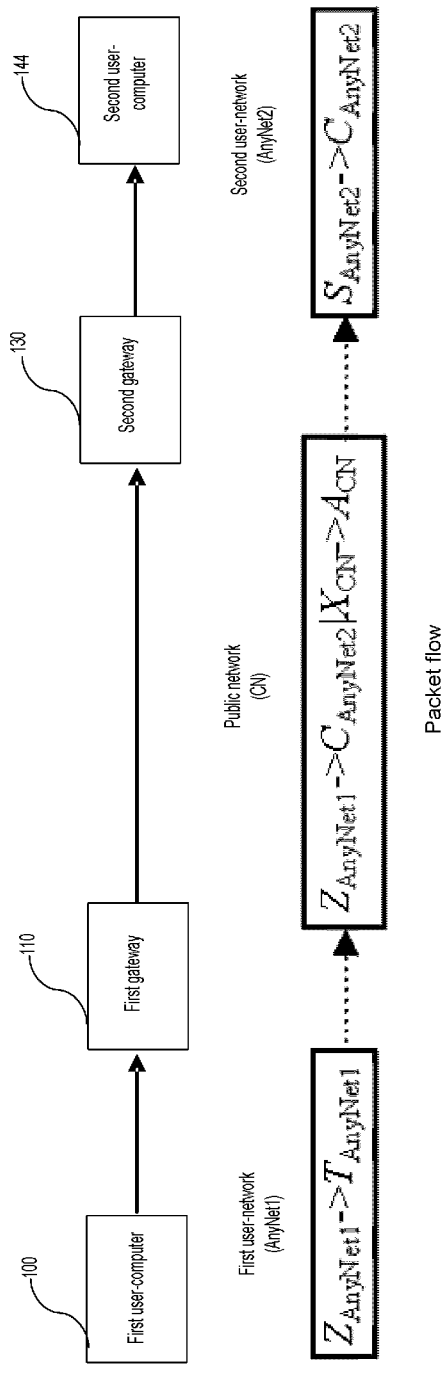
FIG. 6 shows a process for transmitting packet data by attempting communication between computers in heterogeneous user-networks according to the exemplary embodiment of the present invention.

FIG. 6 shows a process for transmission of packet data by attempting communication between computers included in a heterogeneous network according to the exemplary embodiment of the present invention.

When transmitting packet data to the user-network specific address $T_{AnyNet1}$, the first user-computer 100 routes the packet data to be transmitted to the first gateway 110.

Herein, the user-network specific address $T_{AnyNet1}$ is an amount of addresses that are not used in the second user-network 140, and is used for indicating computers in a different user-network.

That is, the user-network specific address $T_{AnyNet1}$ stores an entire network address of the second user-computer (C) 144.

The first gateway 110 determines whether a category of information on the entire network address $A_{CN}{:}C_{AnyNet2}$ of the second user-computer 144 exists in an address translation database provided in the first gateway 110. Herein, the entire network address $A_{CN}{:}C_{AnyNet2}$ of the second user-computer 144 matches the user-network specific address $T_{AnyNet1}$.

The first gateway 110 simply eliminates the packet data to be transmitted when the first gateway 110 determines that the category for the entire network address $A_{CN}{:}C_{AnyNet2}$ of the second user-computer 144 does not exist in the address transmission database.

When determining that the category for the entire network address $A_{CN}{:}C_{AnyNet2}$ of the second user-computer 144 does exist in the address translation database, the first gateway 110 extracts the category for the entire network address $A_{CN}{:}C_{AnyNet2}$ of the second user-computer 144 from the address translation database.

The first gateway 110 extracts a payload for data transmission from the packet data to be transmitted, and includes the extracted payload in the first user-network packet data.

Herein, the first user-network packet data is a new type of packet data, and both a transmission address (i.e., address $Z_{AnyNet1}$ of the first user-computer 100 in the first user-network 100) and the entire network address $A_{CN}{:}C_{AnyNet2}$ of the second user-computer 114 extracted from the address translation database are included in IP header information.

The first gateway 110 generates first user-network packet data and transmits the same to the second gateway 130 through the public network 120.

Subsequently, the second gateway 130 determines whether a user-network specific address $S_{AnyNet2}$ for the entire network address $X_{CN}{:}Z_{AnyNet1}$ of the first user-computer 100 is allocated.

When determining that the user-network specific address $S_{AnyNet2}$ is not allocated, the second gateway 130 allocates the user-network specific address $S_{AnyNet2}$ and stores the same in an address translation database formed in the second gateway 130 as $S_{AnyNet2}{:}(X_{CN}{:}Z_{AnyNet1})$.

The second gateway 130 extracts a payload for data transmission from the first user-network packet data transmitted from the first gateway 110, and includes the payload in second user-network packet data.

The second gateway 130 sets the entire network address $A_{CN}{:}C_{AnyNet2}$ of the second user-computer 144 to a receiving address and the user-network specific address $S_{AnyNet2}$ to a transmission address and includes the transmission address and the receiving address in header information of second user-network packet data, and generates second user-network packet data, which is a new type of packet data and transmits the same to the second user-computer 144. Herein, the entire network address $A_{CN}{:}C_{AnyNet2}$ of the second user-computer 144 and the user-network specific address $S_{AnyNet2}$ are included in the first user-network packet data.

Packet data transmission from the second user-computer 144 to the first user-computer 100 is opposite to the packet data transmission of FIG. 5, and therefore a detailed description will be omitted.

With above-described configurations, based on one network, mutual communication between heterogeneous networks can be expected according to the exemplary embodiment of the present invention.

According to the exemplary embodiment of the present invention, protocol stack modification in the user-computer is not required and therefore more prompt communication can be expected between various networks.

According to the exemplary embodiment of the present invention, communication between an IPv4 private user-network and another IPv4 private user-network and communication between an IPv4 public user-network and another IPv4 private user-network can be supported, and therefore a virtual private network (VPN) can be easily implemented.

In addition, since a transition process from an IPv4 user-network to an IPv6 user-network can be easily achieved, a prompt transition process from IPv4 to IPv6 can be expected according to the exemplary embodiment of the present invention.

Further, according the exemplary embodiment of the present invention, one public network address is used when one user-network accesses a public network and private network addresses can be used for computers in the user-network, and therefore the IPv4 Internet can be used longer without translating the IPv4 Internet to IPv6.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for establishing a connection between user-computers belonging to Internet-compatible heterogeneous user-networks based on a public network, the method comprising:

receiving a domain name translation request from a first user-computer included in a first user-network, the domain name translation request including a domain name of a second user-computer included in a second user-network;

allocating a specific address for indicating an entire network address of the second user-computer, wherein the specific address is an address of the first user-network allocated among addresses which are not used in the first user-network, and the entire network address is a combination of a public network address of a gateway, for connecting the second user-network and the public network, and a second user-computer address in the second user-network; and transmitting the specific address together with the entire network address to the first user-computer, wherein the specific address differs from each of the entire network address of the second user-computer, the second user-computer address, and the domain name of the second user-computer, and is used for the first user-computer to communicate with the second user-computer.

2. The method of claim 1, wherein allocating the specific address comprises:

when the entire network address of the second user-computer is not stored, requesting the domain name translation from a domain name server of the second user-network; and receiving the entire network address of the second user-computer from the domain name server.

3. The method of claim 1, wherein allocating the specific address comprises requesting the specific address from a gateway of the first user-network and receiving the specific address.

4. A method for establishing a connection between user-computers belonging to Internet-compatible heterogeneous networks based on a public network, the method comprising:
   receiving a domain name translation request from a first user-computer included in a first user-network, the request including a domain name of a second user-computer included in a second user-network;
   extracting an entire network address of the second user-computer from the domain name, wherein the entire network address is a combination of a public network address of a gateway, for connecting the second user-network and the public network, and a second user-computer address in the second user-network;
   allocating a specific address for indicating the entire network address of the second user-computer, wherein the specific address is an address of the first user-network allocated among addresses which are not used in the first user-network; and
   transmitting the specific address together with the entire network address to the first user-computer,
   wherein the specific address differs from each of the entire network address of the second user-computer, the second user-computer address, and the domain name of the second user-computer, and is used for the first user-computer to communicate with the second user-computer.

5. The method of claim 4, wherein allocating the specific address comprises requesting allocation of the specific address from a gateway for connecting the first user-network.

6. A domain name system (DNS) proxy server configured to determine whether to open or close an Internet application program of a user-computer by using web page information, the DNS proxy server comprising:
   an internal memory unit configured to store an entire network address of a second user-computer included in a second user-network, wherein the entire network address is a combination of a public network address of a second gateway, for connecting the second user-network and a public network, and a second user-computer address in the second user-network;
   an internal database configured to store a specific address for indicating and accessing the entire network address, wherein the specific address is an address of a first user-network allocated among addresses which are not used in the first user-network; and
   a controller configured to transmit the specific address allocated to the internal database to a first user-computer included in the first user-network with reference to the entire network address of the second user-computer stored in the internal memory unit when receiving a domain name translation request for the second user-computer from the first user-computer belonging to the first user-network, the domain name translation request including a domain name of the second user-computer,
   wherein the specific address differs from each of the entire network address of the second user-computer, the second user-computer address, and the of the second user-computer, and is used for the first user-computer to communicate with the second user-computer.

7. The DNS proxy server of claim 6, wherein when the specific address is not allocated to the internal database, the DNS proxy server requests allocation of the specific address from a first gateway for connecting the first user-network and the public network, and receives the specific address.

8. The DNS proxy server of claim 7, wherein the specific address has a feature for indicating information of the entire network address of the second user-computer in the second user-network.

9. The DNS proxy server of claim 7, wherein the first gateway generates first user-network packet data that includes address information of the first user-computer and the entire network address of the second user-computer in protocol header information, and transmits the first user-network packet data to the second gateway.

10. The DNS proxy server of claim 9, wherein the first gateway eliminates packet data transmitted from the first user-computer when the entire network address of the second user-computer is not stored.

11. The DSN proxy server of claim 9, wherein the second gateway generates second user-network packet data that includes the entire network address of the second user-computer as a receiving address and a specific address of the first user-computer as a transmitting address in header information, and transmits the second user-network packet data to the second user-computer in the second user-network.

12. The DNS proxy server of claim 6, wherein when the entire network address is not stored in the internal memory unit, the DNS proxy server requests the domain name translation from a domain name server of the second user-network and receives the entire network address of the second user-computer in the second user-network.

\* \* \* \* \*